United States Patent [19]

Gabriel et al.

[11] Patent Number: 4,730,928

[45] Date of Patent: Mar. 15, 1988

[54] POSITION MEASUREMENT BY LASER BEAM

[75] Inventors: David Gabriel, Kingston; David S. Audus, Marlow; Malcolm A. Chennell, Perivale, all of England

[73] Assignee: Lasercheck Limited, Burnham, England

[21] Appl. No.: 705,469

[22] PCT Filed: Jun. 21, 1984

[86] PCT No.: PCT/GB84/00217

§ 371 Date: Feb. 21, 1985

§ 102(e) Date: Feb. 21, 1985

[87] PCT Pub. No.: WO85/00222

PCT Pub. Date: Jan. 17, 1985

[30] Foreign Application Priority Data

Jun. 21, 1983 [GB] United Kingdom ............... 8316875
Jul. 12, 1983 [GB] United Kingdom ............... 8318821

[51] Int. Cl.$^4$ ............................................. G01B 11/14
[52] U.S. Cl. ................................... 356/373; 356/400
[58] Field of Search ............... 356/399, 400; 33/28 G

[56] References Cited

U.S. PATENT DOCUMENTS

| | | | |
|---|---|---|---|
| 3,723,013 | 3/1973 | Stirland et al. | 356/400 |
| 3,778,169 | 12/1973 | Adams | 356/399 |
| 3,902,810 | 9/1975 | Hamar | 356/400 |
| 4,172,665 | 10/1979 | Wakita et al. | 356/400 |
| 4,346,994 | 8/1982 | Cruz | 356/400 |

FOREIGN PATENT DOCUMENTS 2496872 12/1980 France .
81/03698 12/1981 PCT Int'l Appl. .

OTHER PUBLICATIONS

"Universal Automatic Wafer Fine Alignment and Positioning System", Chwalow et al, *IBM Technical Disclosure*, vol. 17, #3, 8/1977.

Primary Examiner—R. A. Rosenberger
Assistant Examiner—Crystal D. Cooper
Attorney, Agent, or Firm—Sughrue, Mion, Zinn, Macpeak and Seas

[57] ABSTRACT

A laser beam from a source 20 is used to provide a reference in space adjacent a portion of a structure movements of which are monitored. The beam is received by a receiver 30. A number of targets 300 may be mounted to move with parts of the structure extending alongside the beam path. Target constructions (FIGS. 6–8) are described which allow for normal passage of the beam past the target but which enable the position of the beam relative to a given target to be measured by intercepting the beam. In a variation (FIG. 13) for civil engineering use, a single target is selectively mountable to one of a number of supports. Another variation (FIG. 11) uses graduated mesh targets on which the beam impinges on each mesh but is also transmitted through the mesh. Dynamic movement of a part of structure such as a bridge is measured with a single target attached to the part in question and comprising a barred reflective assembly (FIG. 3), a fibre optic array (FIG. 4) or a position sensing photo-diode (FIG. 5). For use in such systems there is also described a spatial filter for a laser receiver (FIG. 10), a laser assembly adapted for precise repositioning (FIG. 9) and a dust excluding laser housing (FIG. 12).

13 Claims, 39 Drawing Figures

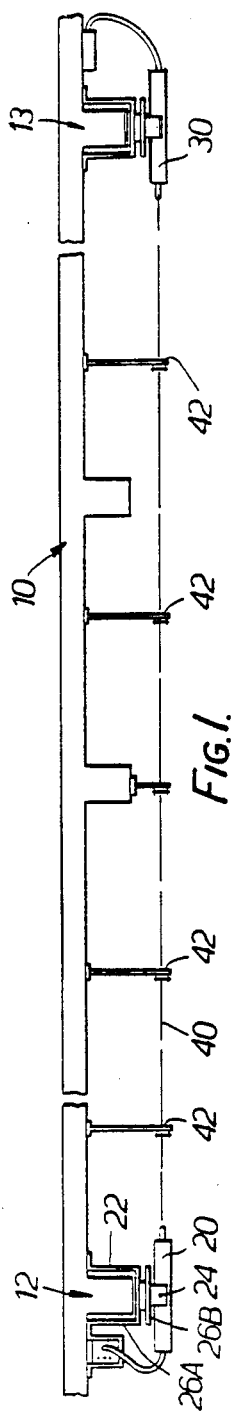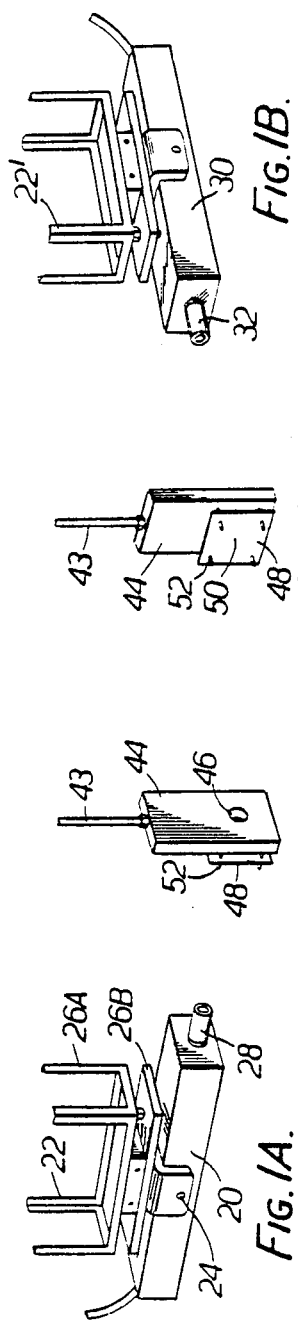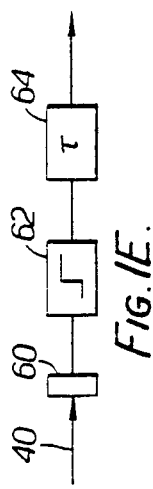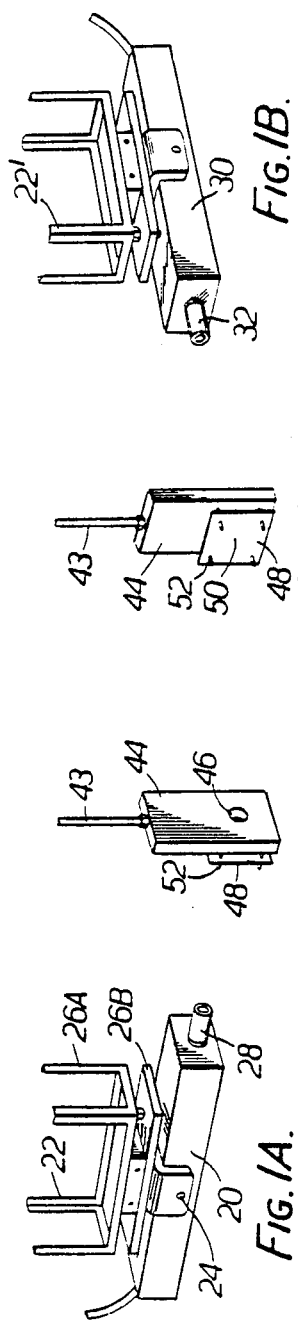

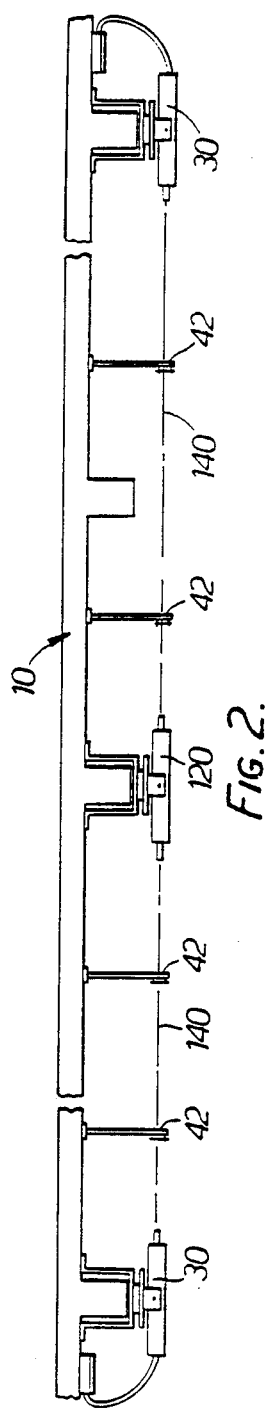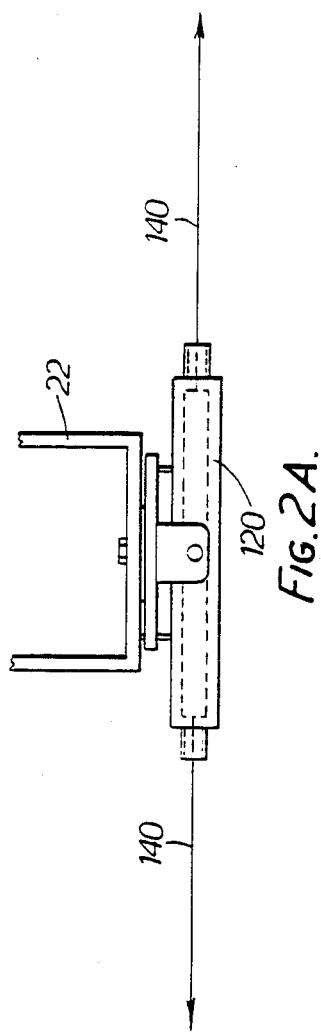

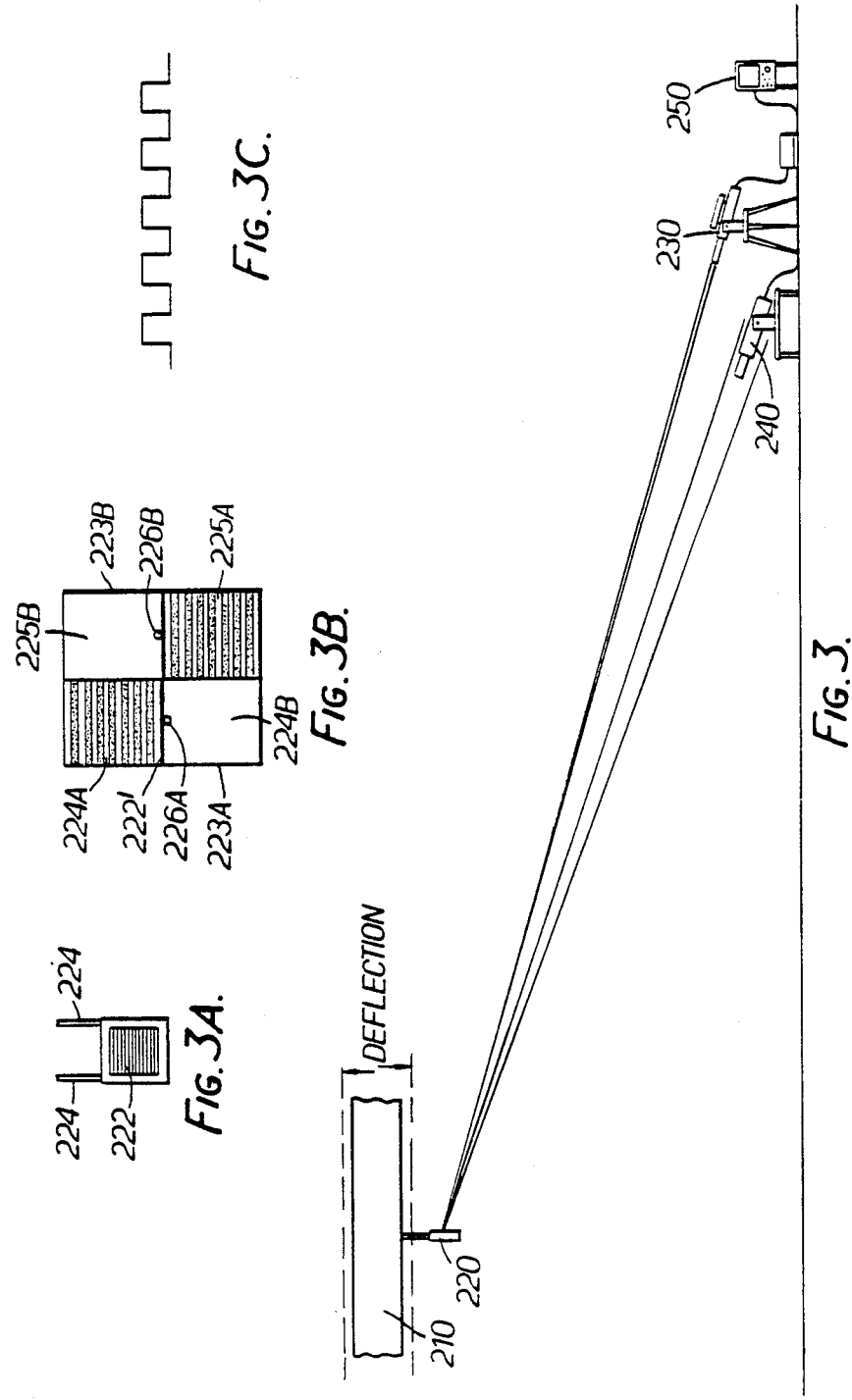

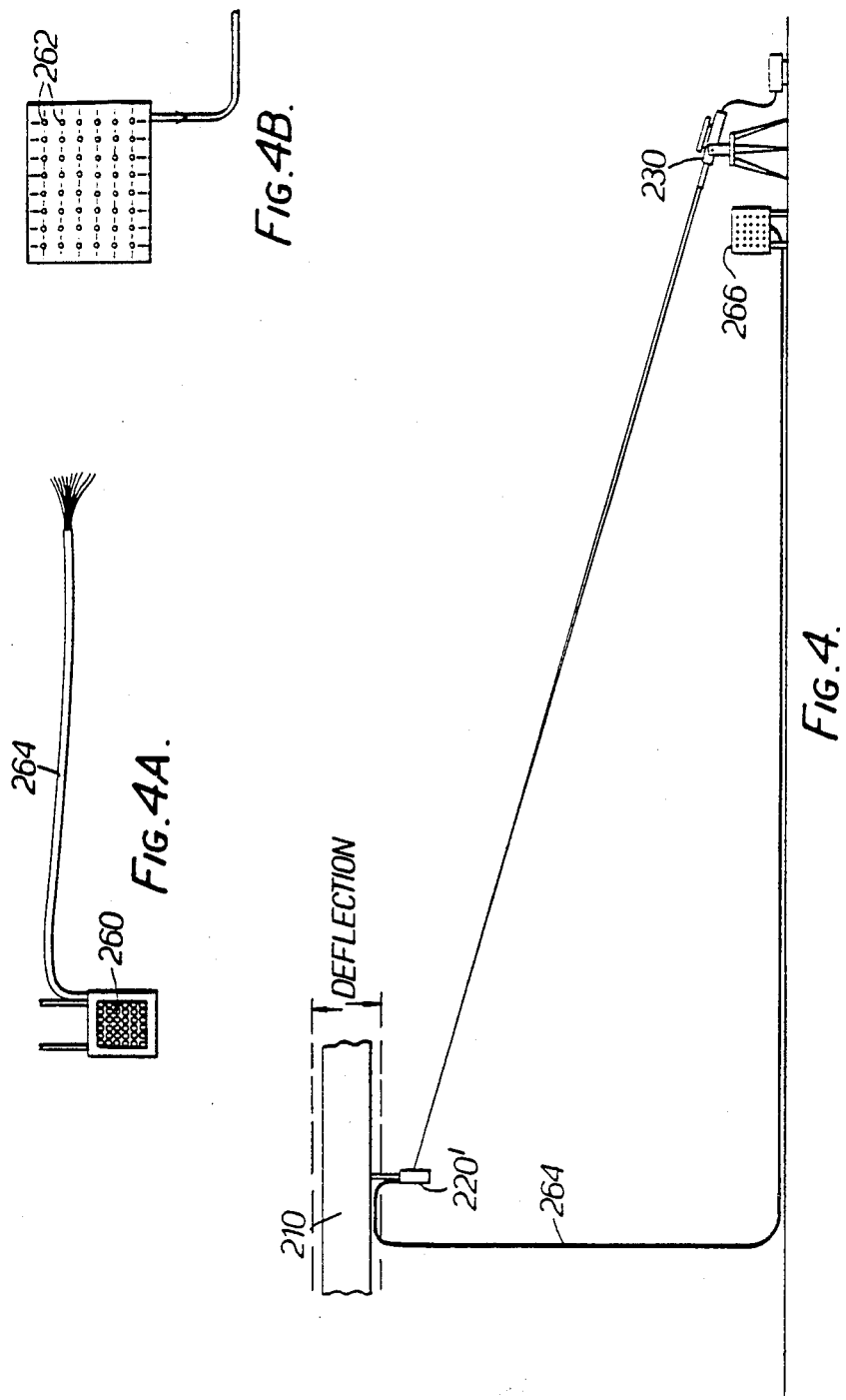

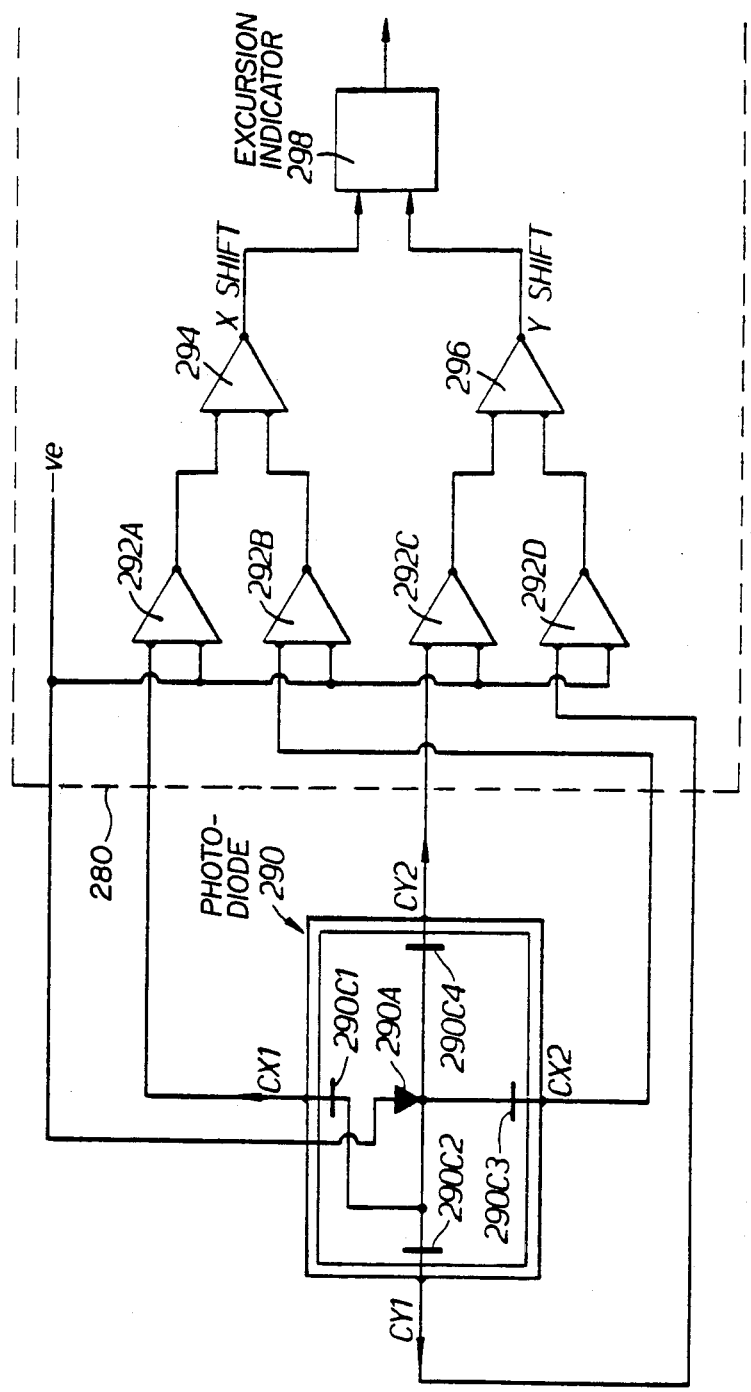

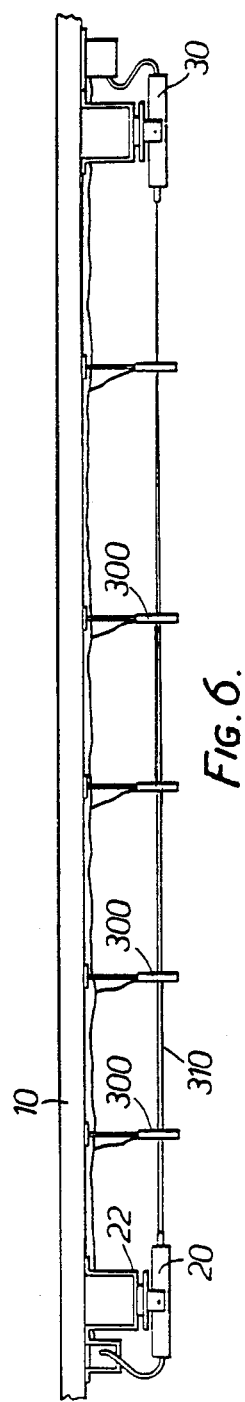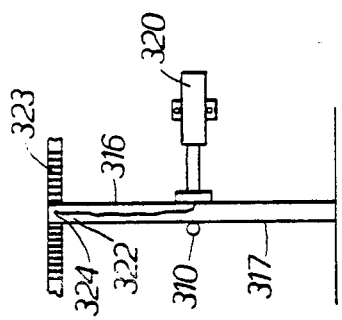

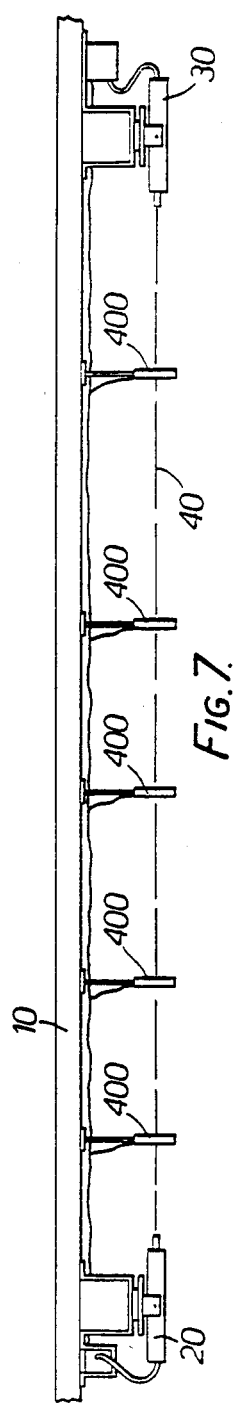
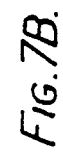
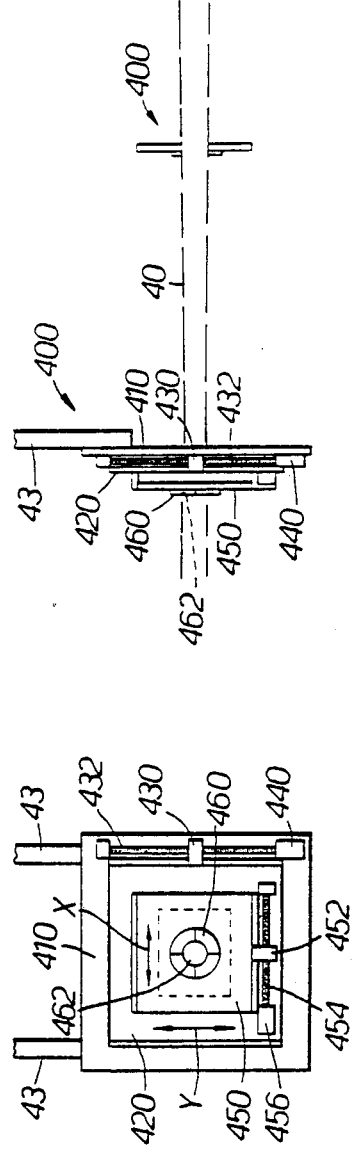

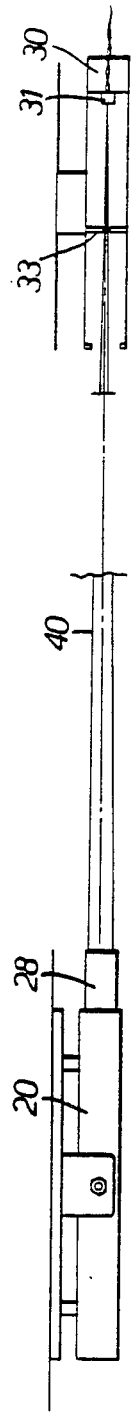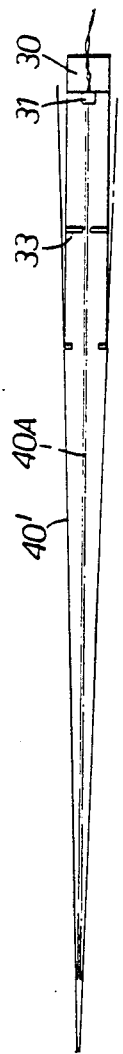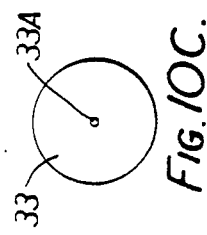

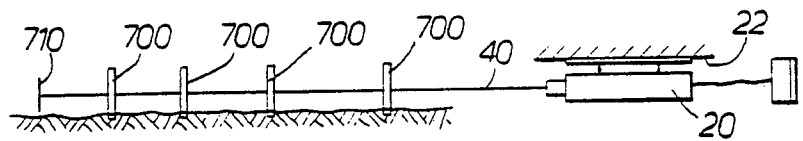
Fig. 11.
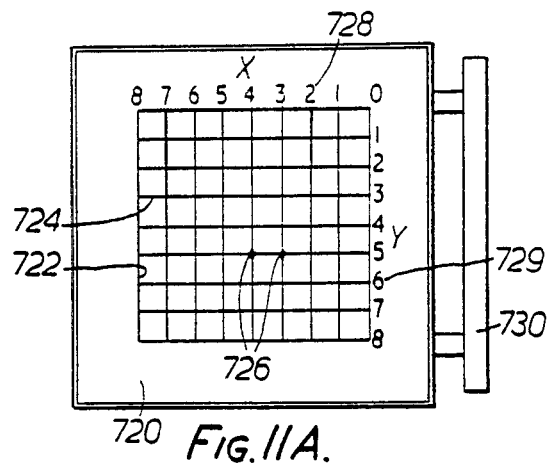
Fig. 11A.
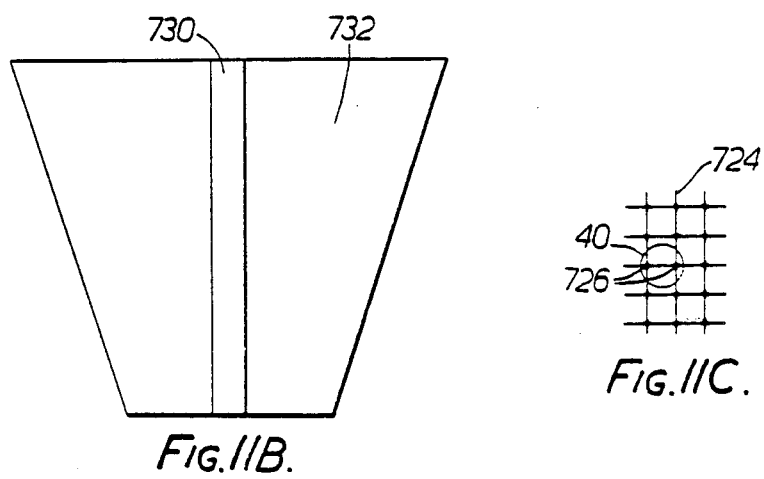
Fig. 11B.
Fig. 11C.

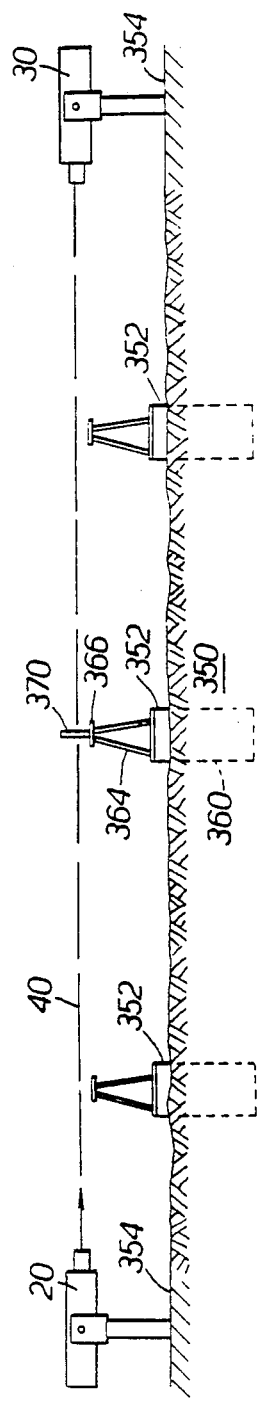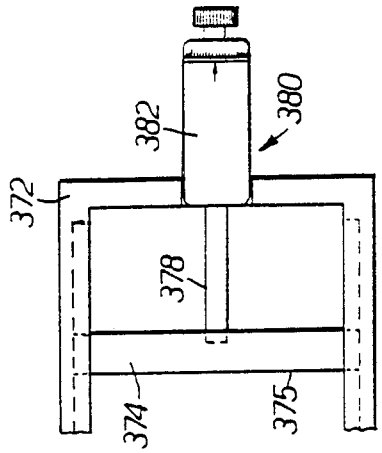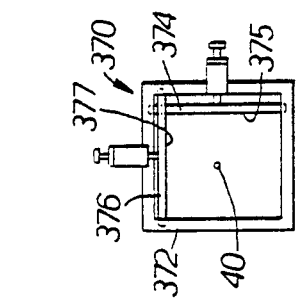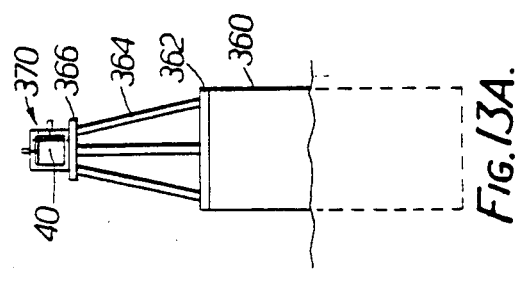

POSITION MEASUREMENT BY LASER BEAM

FIELD OF THE INVENTION

This invention is generally concerned with the use of a laser beam to provide a reference in space against which movement of or within structures may be measured or parts may be aligned. The structures may be natural or man-made.

In buildings, there often arises the need to measure either absolutely, or with respect to preset limits, movement of a part of the building, e.g. settling movement. In structures such as bridges, it may be desirable to measure the dynamic response of the structure to loads on it, e.g. the deflection of a bridge in response to loads placed on it. For some natural structures there is a need to monitor ground movements or differential displacements within the structure. In this connection monitoring in earthquake prone areas comes to mind. Thus there are two broad types of movement. One is progressive movement, essentially without recovery: the other is dynamic movement with recovery. In other cases there may be a need to bring two separated parts of a structure or apparatus into a required alignment.

BACKGROUND OF THE INVENTION

There have been various proposals for using a laser beam as a reference that impinges on a target which is mounted to a structure, or a part of a structure under surveillance. As the structure moves the target moves with it. The beam provides a spatial reference against which displacements of the target are detectable. It is, or course, possible to mount the laser source to whatever is to be monitored. Normally, however, the target will be fixed to the surveyed structure liable to movement and the laser source mounted to a fixed point.

Many of the proposals provide for a laser source to direct its beam at a target which, for example, comprises some form of photocell assembly whereby the position of the beam on the assembly can be detected. Examples of this type can be found in British Patent Specifications Nos. 1,178,007: 1,313,416 (in which refractive displacement of the beam is measured): 1,323,104 (which is concerned specifically with building structures): 1,338,167 (which is also concerned with alignment in building structures): 1,372,145: 1,436,740 (which is for contour measurement as the target is moved along a path): 1,513,380: and in PCT publication No. W081/03698. Except for specification 1,372,145, all the above-mentioned specifications essentially measure a relative laterial displacement between the laser source, which is usually taken to be mounted on a location taken as fixed, and the target which is on the part subject to displacement. Specification No. 1,372,145 (U.S. Pat. No. 3,799,674 to Guillet et al) shows monitoring of a dam in which apparent deflections of the beam relative to two targets mounted on the dam wall are detected in respective orthogonal directions by respective targets. It will be appreciated that in general the optical system should be kept as simple as possible to avoid unwanted displacements due to relative movement of parts of the system, such as arising from temperature changes.

There has arisen a need to be able to monitor structures at various points for signs of movement with apparatus that requires little attention and supervision. One system for monitoring an elongate structure at various points along its length is disclosed in British patent specification No. 2,101,305 in which displacements in the hull of a tanker are monitored by directing a laser beam along the tanker and locating a reflecting target at points along its length. Measurements are made by interferometry between the reflected beam and the primary beam. In this case one reflector target point at a time is measured. The system is relatively complicated to set up and relatively complex processing circuitry is required. An older technique for use in surveying railway tracks is the so-called shadow board technique such as described in British patent specification No. 1,322,785. Here again only one point along the track is measured at a time.

SUMMARY OF THE INVENTION

A first aspect of the invention provides for monitoring whether the laser beam as a datum has itself moved by also monitoring the positions of one or more reference laser beams in fixed spatial relationship with the first mentioned (primary) beam. The reference beam or beams could be derived from the primary beam but other ways of deriving the reference(s) are presently preferred and form second aspects of the invention.

A third aspect of the invention lies in providing a measurement of actual movement of a target mounted on a surveilled structure and targets suitable for that purpose. Such arrangements find particular application in dynamic measurements as will be described. Target constructions are described to provide a measurement along a single axis or along two axes (X-Y). Some target constructions effectively allow only one target to be used. These target arrangements include novel arrays of detector elements and novel patterned mirrors.

A fourth aspect of the invention relates to plural targets that are usable to track the beam along at least one axis, the tracking also providing a measure of beam position relative to target. Various constructions will be described.

A fifth aspect of the invention lies in the provision of means for a laser to prevent contamination of the optics and consequent loss of performance.

A sixth aspect of the invention lies in a system for monitoring movements of a structure in which a number of points in the structure are provided with support means that move locally with the structure. A target is detachably mounted to a selected one of the support means, which are adapted to provide a repeatable positioning of the target on the support means, whereby a local measurement of the target relative to a laser beam reference may be made.

The invention and its various aspects will now be further described with reference to the accompanying drawings.

BRIEF DESCRIPTION OF THE DRAWINGS

FIGS. 1A, 1B, 1C, 1D and 1E show a general view of a monitoring system as disclosed in commonly assigned U.S. application Ser. No. 623,060 filed on June 21, 1984 and now abandoned, for a structure using apertured targets (detectors), FIGS. 1A, 1B, 1C and 1D showing details of the system, and FIG. 1E a receiver block diagram;

FIGS. 2 and 2A show a modification of the system of FIG. 1 with a laser transmitter arrangement between two receivers for monitoring a structure, which laser transmitter arrangement may find use in other apparatus subsequently described;

FIGS. 3, 3A, 3B and 3C show a system embodying the invention for making actual measurements of deflection of a structure, particularly under dynamic conditions, FIGS. 3A and 3B illustrate patterned targets, and FIG. 3C shows a detector output signal;

FIGS. 4, 4A and 4B show a modification of the system of FIG. 3 to use a target comprising a matrix of detector elements seen in FIG. 4A and to an enlarged scale in FIG. 4B;

FIGS. 5 and 5A show another version of the system of FIGS. 3 and 4 but using another form of detector element in the target, and FIG. 5A shows the detctor element and its associated circuitry in more detail;

FIGS. 6, 6A and 6B show a development of the system of FIGS. 1 or 2 which is in accord with this invention and in which a plurality of position measuring targets are usable along a laser beam datum to provide individual beam position (X-Y) measurements, FIG. 6A showing one such target and FIG. 6B details of the target;

FIGS. 7, 7A and 7B show another development of the system of FIGS. 1 or 2 which is in accord with the invention and in which a target constructions is shown that enables the target to track the beam, i.e. to remain aligned with it, FIGS. 7A and 7B showing face and partial section views of one target;

FIGS. 10A, 10B and 10C ilustrate a receiver with a spatial filter applied to a convergent and divergent laser beam respectively, a technique of general application in various of the embodiments herein described;

FIGS. 11, 11A, 11B, and 11C show another system of the invention for monitoring progressive movement, FIG. 11A showing one of the targets, FIGS. 11B a side view of a target housing, and FIG. 11C a detail of the target in operation;

FIGS. 13, 13A, 13B and 13C show another system according to the invention applied to an embankment or like structure, FIG. 13A showing one mounting point for a target, FIG. 13B showing a simplified face view of a target, and FIG. 13C showing a detail of the target.

Figure 5:
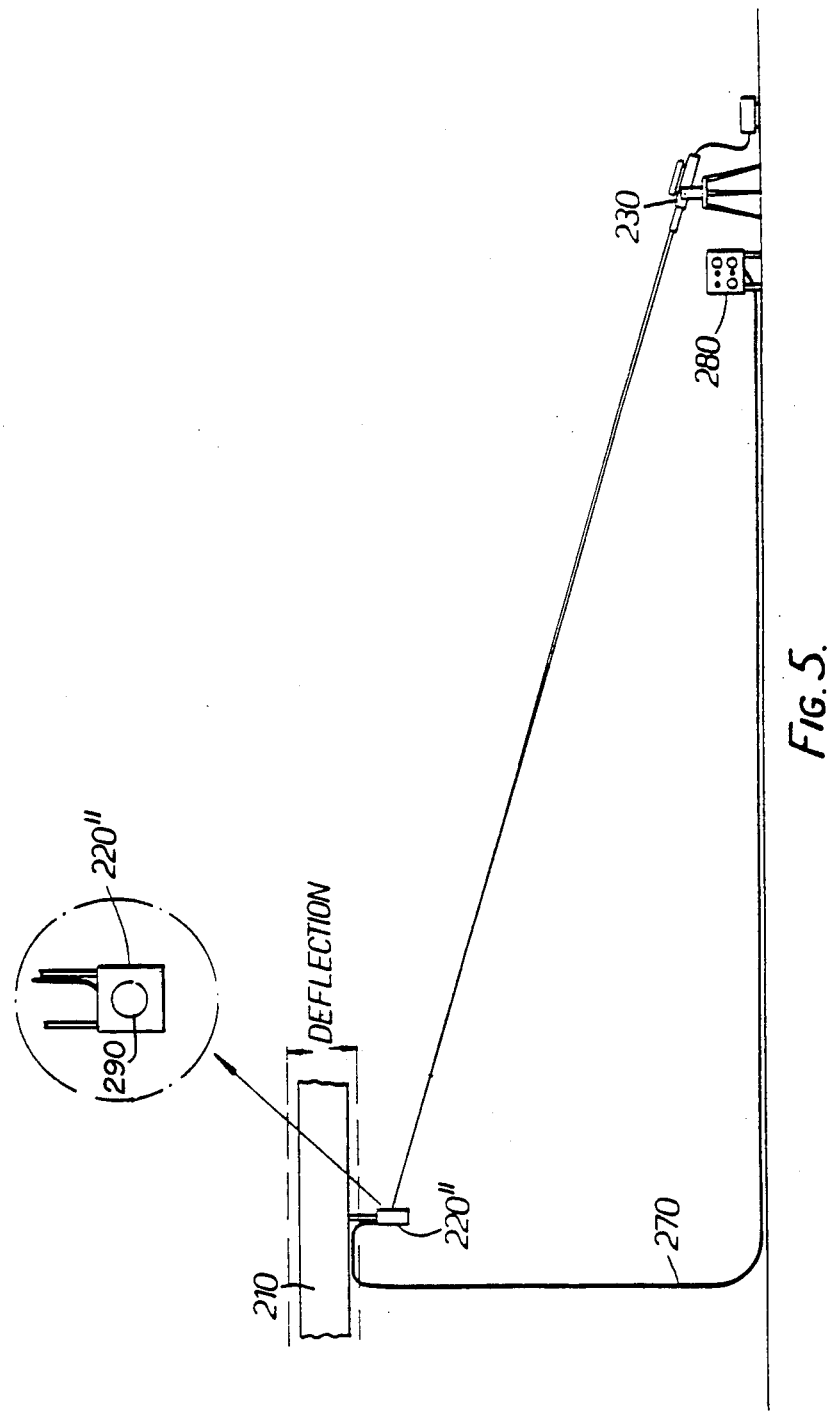

In order that apparatus and systems embodying the invention and described subsequently may be better understood, there will first be described with reference to FIG. 1 a system as disclosed in the Ser. No. 623,060 application, and which serves to illustrate certain underlying principles of this invention.

Referring to FIG. 1, there is shown in diagrammatic form a system using a laser beam as a spatial referenc to monitor movement within a building structure generally indicated at 10.

At a point 12 of the structure that provides a reference location there is mounted a low power laser 20 supported by a cradle 22 secured to the structure in any appropriate fashion. The laser 20 is mounted for pivotal movement in a vertical plane about axis 24 and the cradle has at least some degree of azimuth adjustment of the laser 20 between parts 26A and 26B. In addition the cradle assembly should allow, for example by the use of slotted guides, for some absolute adjustment of position in the vertical and horizontal planes. This combination of linear and angular adjustment allows for accurate alignment. Once aligned the assembly is securely locked in position by means not shown. The laser 20 and cradle 22 are shown to a larger scale in FIG. 1A.

The laser 20 has an optical system 28 which preferably includes an iris (not shown) for assisting in limiting beam divergence. At the other end 13 of the optical path 40 is mounted a receiver 30 supported by a cradle 22' of the same construction as the laser cradle 22 to allow alignment of the receiver. The receiver includes input optics 32 which are discussed further below. The receiver 30 and cradle 22' are shown to a larger scale in FIG. 1B. The laser and receiver are aligned on the laser beam axis 40 which inpinges on one or preferably a succession of targets or movement detectors 42 located along the beam path. Each target 42 comprises a support stem 43 mounted to a portion of structure 10 to be monitored; a depending plate 44 having a relatively large aperture 46 therethrough; and a target plate 48 having a smaller aperture 50 aligned centrally with that in plate 44. FIGS. 1C and 1D show views of opposite sides of a target. The plate 48 is adjustably mounted by any suitable support means 52 to the plate 44 so that the target plate aperture 50 is alignable with the beam, i.e. the beam impinges on the aperture 50 so as to pass through the target.

The receiver shown in block diagram in FIG. 1E comprises a photo-detector 60 for the laser beam, a threshold circuit 62 which provides an output when the received light level drops below an adjustable predetermined value and a timer circuit 64 providing a delay so as to only provide an output indicative of movement in the structure when the threshold circuit output is maintained for at least a predetermined period. This is to avoid warning outputs being given for momentary interruptions of the beam. Movement of any target 42 by mroe than a predetermined amount determined by the size of aperture 50 will cause the received light to drop to a value low enough to activate the threshold circuit 62.

The system shown in FIG. 1 shows a straight-line optical path. It will be appreciated that with the use of mirrors the path can be configured as desired. The apertures 50 would normally be circular though other shapes are possible to define different allowable movements in different directions. The laser can operate at wavelengths within the visible light spectrum or outside. Visible light has an advantage that the beam can be seen on a target for alignment purposes.

Referring now to FIG. 2 there is shown a modification of the arrangement of FIG. 1 in which a laser transmitter 120 is mounted between two receivers 30 with interposed targets on respective beam paths 140. To this end the laser transmitter 120 is either constructed as a double-ended laser or as a pair of lasers rigidly mounted back to back. The double-ended laser is contemplated to be realised by having partial mirrors at both ends of the optical cavity to allow the laser light to emerge in opposite directions, as seen in FIG. 2A.

The arrangement of FIG. 2 has the advantage of making possible a longer total surveillance path. For safety reasons the power of a laser beam is restricted thereby restricting the length of the path over which a useful signal is receivable. Thus the centrally mounted laser transmitter enables a total path length double that otherwise surveillable. A second advantage can be seen by looking at the system of FIG. 1 or one half of the system of FIG. 2. Misalignment arising between transmitter and receiver after installation, by skewing of the transmitter will be liable to cause a false warning of movement of a target. In FIG. 2, the two-path arrangement will cause both receivers to output a warning if the transmitter skews. Actuation of both receivers in this way would not normally be expected. Thus by looking at both outputs together, simultaneous outputs would be taken to be a system fault, and not due to target movement.

To perform in this way the two beams from transmitter 120 must be maintained in accurate relationship—not necessarily in directly opposite directions—by the inherent nature of the laser used in the double-ended case or by ensuring a rigid mounting between the lasers where a pair are used.

The systems of FIGS. 1 and 2 are designed to detect movements or the result of a succession of progressive movements. By sizing and shaping the target apertures some variation of the limits along different axes would be possible. In some circumstances it is necessary to make measurements of the dynamic response of a structure under stress, e.g. a bridge as mentioned above. In such cases it is necessary to obtain an actual measurement of the value of deflection of movement. There will now be described embodiments in accordance with the invention for performing dynamic measurements.

Referring to FIG. 3, there is shown a portion 210 of a structure which is exemplified by deflecting in a vertical direction under load. Securely mounted to and depending from structure 210 is a reflective target 220 that moves with the structure. At a remove point, e.g. ground providing a stable positional reference, a laser 230 is mounted having its beam focused by appropriate optics on the target. The reflected beam is returned to a receiver 240 incorporating a photo-detector. The receiver 240 is conveniently, but not necessarily, adjacent, the laser 230. It will be appreciated that the figure is diagrammatic and not to scale, so that angles are not shown correctly.

The reflective target is a mirror having a pattern of reflective and non-reflective zones which, in the illustrated embodiment, are bars extending normal to the direction of motion and each bar having its width uniform in that direction. FIG. 3A shows a face view of the mirror 222 suspended on supports 224.

The mirror is preferably provided with some weather protection for its surface, such as a shroud housing. For example one side of the housing illustrated in FIG. 11B to be described. In addition the mirror structure may be provided with a fan or blower to maintain a purging current of air across the mirror surface. This will assist in preventing the accumulation of dirt on the mirror. The mirror may be provided with a heater or the purging air heated to prevent misting.

In use of the system of FIG. 3, the focused laser beam will effectively scan the mirror pattern as the mirror moves vertically with movements of the structure. The photo-detector circuit in the receiver 240 will produce a pulse output as indicated at FIG. 3C as the bars are scanned, the pulse duration and interval being a function of the rate of movement, and the number of pulses in a given direction of movement being a measure of deflection which is calculable from knowing the pattern dimensions. The pulse output from the receiver can be used by first storing the information carried by the pulses and then analyzing the information. For example the pulse output from the receiver 240 could be applied to a variable persistence or storage oscilloscope 250 and stored therein.

It is preferred to provide some means for clearly distinguishing the direction of movement of the target, i.e. up or down in the embodiment illustrated. The target modification illustrated in FIG. 3B provides this facility. FIG. 3B shows a mirror 222' divided into two parts 223A and 223B (or two separate mirrors rigidly mounted together) along an axis (vertical) in the direction of target movement. The mirror parts are in turn divided on a transverse (horizontal) axis into a barred and a non-barred portion 224A, 225A and 224B, 225B respectively. Each barred portion is arranged in reflective and non-reflective bars as described with reference to FIG. 3A. The non-barred portions 225B and 224B could be non-reflective but are preferably plain mirror areas. As seen from the figure the barred areas extend in opposite directions from the horizontal axis. The laser transmitter requires two lasers 230 (or the use of beam splitting optics) which are focused at a respective point 226A, B just at the edge of a respective barred area 224A, B. Target motion in one direction causes the relevant reflected beam to be pulsed from one mirror part: movement in the other direction causes the other reflected beam to be pulsed from the other part. Apart from two transmitted laser beams, two receivers 240 will be required, one for each beam.

The two barred areas could overlap in the direction of movement. The more crucial feature is to ensure that the respective laser beam is set up at the edge bounding the unbarred portion. The advantage of having this portion reflective is that movement of the target causing the associated beam to fall on this unbarred portion will retain a signal at the associated receiver as a check on correct operation.

Another dynamic measurement system is shown in FIG. 4 in which the structure 210 has mounted to it a target 220' on which is focused the laser beam from laser 230 as in FIG. 3. In this case the target or detector 220' comprises a matrix 260 of fibre optic strands better seen in the face and enlarged face views of FIGS. 4A and 4B. The matrix can be made by packing a multistrand fibre optic into a bundle which is set in resin and sheared to provide a smooth face with the fibre optic ends 262 set on a regular co-ordinate grid. The bundle 264 of fibre optics runs to a convenient measurement point where it is likewise displayed in a co-ordinate grid corresponding to that of FIG. 4B as shown by unit 266. Conveniently in the display unit 266 the fibre optic ends are spaced ou more than at the detector (that is a larger scale grid) to make for easier analysis. This arrangement makes for direct measure of both vertical and horizontal deflection components of the structure 210. For automatic analysis of dynamic responses, the display unit 266 can be provided with an array of photo-detectors, one for each fibre optic end which are scannable to obtain X-Y measurements or are connectable to a chart recorder or oscilloscope to plot the deflection as the laser beam impinges on different fibre optic ends in the target 220'.

An addition to the system of FIG. 4 is to have a second laser directing its beam on the target 220'. The second laser is mounted separately from the first and its signal is detected separately, for example by alternately pulsing the two lasers. A movement of the target will cause a relative movement of the two laser beams over the target in unison. If a relative movement of only one beam is sensed, this indicates that the attitude of the relevant laser has changed rather than there being a true target movement.

FIG. 5 shows another variant in which the target 220″ is made a position-sensing photo-diode 290—seen in the inset. The diode is segmented and from it are obtained signals representing the displacement of the laser beam focused on the diode from the centre of the diode. The signals are sent over cable 270 to an analyzer unit 280 from which the horizontal and vertical deflection components are obtained. The manner in which this done is shown in the block diagram of FIG. 5A in which the position-sensing diode is shown symbollically with a common anode and four cathodes. The photo-diode device 290 has a centrally placed common anode 290A and four cathodes 290C1–290C4. The device 290 is oriented in use such that the opposite cathodes 290C1 and 290C3 lie on the horizontal axis to provide a pair of X-axis signals CX1 and CX2. The other pair of opposite cathodes 290C2 and 290C4 thus lie on the Y-axis and provide a pair of signals CY1 and CY2. The magnitude of each of the cathode signals will depend on the position of the laser beam on the photo-diode relative to the centre. Such diodes are available from United Detectors Technology, Inc. of Santa Monica, Calif., United States of America.

The diode is connected to circuitry in the analyzer 280 indicated by the dash line. This circuitry is illustrated to the extent of showing how the beam position signals are derived. The diode is biased in the usual way with the anode going to a negative rail, each of the cathode signals becoming more negative as more light impinges on the relevant segment of the diode. Each of the signals CX1, 2 and CY1, 2 is first applied to one input (the same sign in each case) of a respective differential amplifier 292A–D whose other input is connected to the common negative supply. The outputs of the differential amplifiers 292A and B which receive signals CX1 and CX2 are applied to the respective inputs of an X-axis differential amplifier 294 from which is obtained a signal (X SHIFT) whose magnitude and polarity represents the position of the laser beam on the X-axis. Similarly the outputs of differential amplifier 292C and D which receives signals CY1 and CY2 are applied to the resepctive inputs of a Y-axis differential amplifier 296 to produce a signal (Y SHIFT) whose magnitude and polarity represents the position of the laser beam on the Y-axis.

The analyzer may also include further circuitry 298 for indicating excursions of the X or Y signals outside set limits—perhaps only this need be known—or for combining the two to detect the total radial excursion from the centre of the target.

It will be appreciated that the arrangements of FIGS. 3 to 5 could be used for sensing movements beyond a set limit as described with reference to FIGS. 1 and 2. However the targets or detectors of FIGS. 3 to 5 entirely intercept the laser beam or beams and thus it is not possible to measure structural movements at a plurality of position along the beam.

FIG. 6 shows a system for monitoring the position of the beam with respect to one or more targets. This system is particularly intended for monitoring structures on a periodic basis over a long term or for continuous monitoring. In the system of FIG. 6, there is shown an arrangment having a similarity with that of FIG. 1 in that there is a structure 10, which is shown horizontal but may be vertical, at a reference location of which is mounted a laser 20 supported by cradle 22. The laser beam is received by a receiver 30 having traversed a plurality of targets or detectors 300 which are mounted along the structure similarly to targets 42. However, the targets 300 of this embodiment are constructed to both allow passage of the beam and to provide an actual position measurement. The principle of operation of each target 300 can be seen from FIG. 6A which shows laser beam 310 normal to the plane of the figure. The target has a frame 312 in which are supported two members 314 and 316 providing straight edges 315 and 317 respectively movable in orthogonal directions (X-Y). Each straight edge member is drivable across the beam path by a respective solenoid or air/fluid driven actuator 318 and 320 so as to intercept the beam. By detecting the movement and/or point of interception, the position of the beam relative to the target is known.

Normally the succession of targets along the beam would be in the state shown in FIG. 6A, that is to say with the straight edge members out of the beam path. By appropriate successive actuation of the straight edge members of the targets such that only one target is active at a time the beam position on the X or Y axis is measured for one target without interference from another. Considering in more detail how the measurement at any one target is performed one arrangement is illustrated in FIG. 6B showing one straight edge member, 316 say, and its actuator 320. One end 322 of the straight edge traverses a scale 323 of alternate reflective/non-reflective bars. An opto-electronic device, i.e. a photo-emitter and photo-detector device, is mounted on the end portion 322 to illuminate and register optical pulses as the actuator drives the member 316 across the beam. The pulses are applied to a counter (not shown). As the straight edge 317 intercepts the beam 310, as indicated in FIG. 6B, the receiver 30 output goes low and is used to interrupt the counter to give a count value that is a measure of beam position in the Y-direction. A similar arrangement is provided on the X-axis. Because of the successive sampling of the beam by the targets 300, a single counter or a single respective X and Y counter can be used with consequent economy of circuitry.

The detection of beam interception can be performed by extending an optical fibre (or light guide) along the straight edge, in fact using this to define the straight edge so that as the beam is intercepted, light enters the fibre and is used to activate a detector at one end of the optical fibre. The detector output stops the counter in this case. The receiver 30 no longer plays a direct part in the position measurement. While it could be omitted its presence provides a direct means of monitoring that the laser beam axis is still on its proper alignment. Skewing of the laser would eventually cause the receiver output to be lost thereby indicating the system was in need of re-alignment.

The target 300 thus far described requires two orthogonal straight edges. X and Y measurements can be simultaneously made with a single straight edge member. Looking again at FIG. 6B the beam 310 is intercepted by the straight edge 317 at a point along its length that is a measure of the X-position. Consequently the straight edge could comprise a linear array of photo-diodes which would be AND-gated to stop the counter for the Y measaurement upon one of them detecting the beam. The individual diode intercepting the beam would represent a measure of the X-position.

Instead of photo-diodes an array of optical fibres could be arranged with their ends in a straight line, akin to the technique of FIG. 4 but in only one direction. As with the just-mentioned photo-diode array, interception of the beam by any one optical fibre would stop the Y-counter; the intercepting optical fibre would be a measure of the X-position.

It will be appreciated that the two straight edge members as shown in FIG. 6A could be modified so that each comprised a linear array of photo-diodes or optical fibres such that the X-Y positions would be measured by the intercept along each edge rather than by use of a separate scale as illustrated in FIG. 6B. The use of one or more movable straight edge members has the effect of simulating a matrix of detector elements such as is illustrated in FIG. 4 while normally allowing the passage of the laser beam. It will be realised that the fibre optic matrix of FIG. 4 can be replaced by other elements such as a matrix of photo-diodes. The interception of the beam could be combined with a reading of a position-representating voltage from a slide potentiometer in an arrangement similar to that discussed below with reference to FIGS. 8A–C.

The use of an apertured target plus the measurement of movement can be realized by an arrangement in which the target aperture is automatically adjustable to remain aligned with the beam. One such arrangement is shown in FIGS. 7A and 7B. FIG. 7 shows a structure 10 with a laser 20 and receiver 30 defining a beam path 40 for monitoring movements of the structure by means of apertured targets 400 mounted to the structure at various places along the beam path. FIG. 7A shows a view of a target 400 on the side facing the laser 20. FIG. 7B is a vertical section through the target on the beam axis. The target comprises a frame 410 which supports a pair of plates. The first, larger, plate 420 (Y-plate) is mounted for vertical movement within the frame 410 and carries a threaded member 430 engaging with a threaded stud 432 that is rotatably supported in frame 410 and coupled to a motor 440 for rotation therealong to drive the plate up or down as seen in the figures. The plate 420 in turn carries a smaller plate 450 (X-plate) running in guides of the plate 420 to be movable in an orthogonal direction. The plate 450 carries a threaded member 452 engaging a threaded stud 454 at right angles to stud 432 coupled to a motor 456 for rotation thereby to drive the X-plate to the right or left as seen in FIG. 7A. The X-plate 450 is centrally apertured and has mounted coaxially with the aperture a four segment photo-detector 460 whose quadrants are divided on the X and Y axes. The photo-detector 460 is apertured at 462 to provide a small aperture to pass the beam of the dimensions envisaged with targets 42 of FIG. 1.

In operation, the arrangement of the four quadrant detector is such that if the aperture 462 is not aligned with the beam axis 40, signals are obtained from the detector 460 dependent on the X and Y direction offsets. These signals are applied in a servo loop (not shown) to drive the motors 440 and 456 to maintain the aperture 462 aligned with the beam axis. Movement information in the X and Y directions is obtained by a separate measurement arrangement for each axis, such as that illustrated in FIG. 6B or FIG. 8A to be described. Consequently the targets 400 of FIG. 7 are beam tracking. The receiver 30 is not essential to their operation but is desirable as a means of checking that the beam axis remains in its desired alignment.

The quadrant detector 460 provides essential on-off signals as the beam impinges on a quadrant or not. It could be replaced by an apertured version of the detector described with reference to FIG. 5A enabling a proportional output to be obtained for the servo loops and a direct measure of beam deflection without the other measurement aid.

Figure 8A:
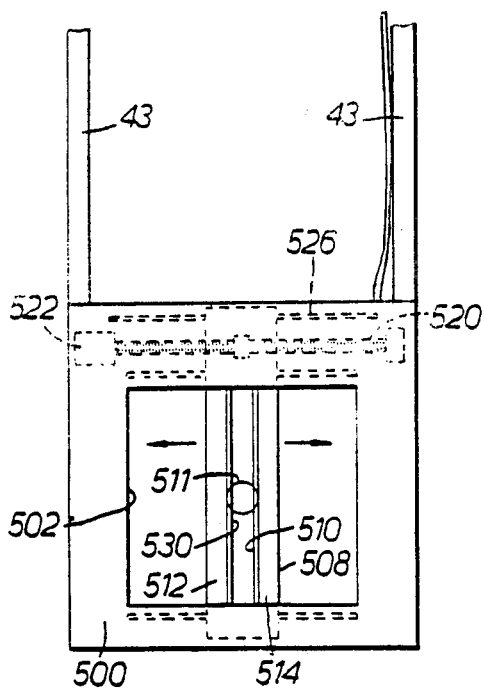
FIGS. 8A, 8B and 8C show a modified construction of a beam tracking target, and also illustrate means for measuring target and thus position, such means being applicable also to the target of FIGS. 7A and 7B.
Figure 8B:
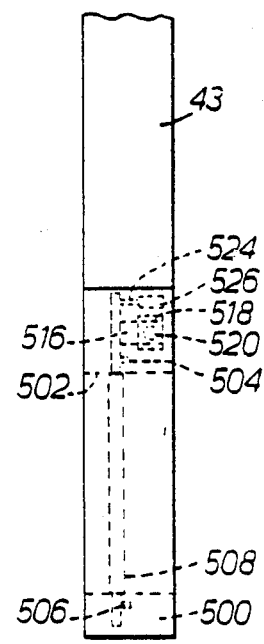
Figure 8C:
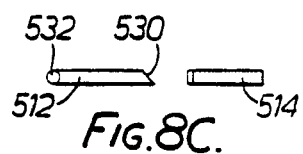

Another target design for a beam tracking arrangement is illustrated in FIGS. 8A and 8B. It is related to the interception of the laser beam by a straight edge such as illustrated in FIGS. 6–6B. In FIGS. 8A and B, a support frame 500 defines a relatively large rectangular aperture 502. As seen in FIG. 8B respective guides 504, 506 are formed in the upper and lower sides of the aperture 502 to locate the ends of a position sensing bar 508 that has a longitudinal (vertical) slot 510 that has a width that is just bridged by the cross-section of the laser beam 511. A cross-section of the slot is seen in FIG. 8C. The bar 508 is made in fact of two parts 512 and 514. Part 512 is of relatively transparent material having a chamfered edge portion 530 defining one side of the slot so that one edge of the beam 511 striking the chamfered edge 530 will cause light to be transmitted transversely through part 530 to a longitudinally extending optical fibre (light guide) 532 leading to a photo-detector (not shown). The other part could be likewise constructed. In this case, the quiescent condition is with the beam on both chamfered edges. Upon the beam leaving one edge as sensed by the relevant photodetector, the motor 522 drives bar 508 in the direction to follow the beam to restore the quiescent condition.

More preferably the part 514 is of different construction to part 512 in order to provide a measure of the beam's Y-position relative to the target. Thus the edge portion of part 514 bounding the slot 510 can be a linear array of detector elements (fibre-optic or photo-diode) of the kind already discussed. An alternative would be a linear version of the point-sensing photo-detector described with reference to FIG. 5A. As regards tracking in the X-direction the situation is the same as for the edge of part 512. The detector elements, if such an array is used, are AND-gated for tracking purposes to provide an output as long as the beam impinges on the slot-bounding edge of part 514.

The upper end (as seen in figures) of bar 508 has a first projecting portion 516 (FIG. 8B) that carries a threaded member 518 engaged with a threaded horizontal stud 520 rotatably supported and driven by a reversible motor 522 to traverse bar 508 across the aperture 502 in the X-direction. The upper end of bar 508 also engages via a second projecting portion 524, e.g. a bifurcated portion, the wiper of a slide type potentiometer 526 which provides a voltage pick-off at the wiper that is a measure of the X-position of the slot 510 when a constant voltage is applied across the potentiometer track. The motor 522 is energized in one sense or the other in a control loop by the beam no longer impinging on one or the other respectively of the slot edges 530 so as to maintain the beam within slot 510. The control loop circuits may be mounted within frame 500.

If tracking in the Y as well as the X direction was required, it would be possible to provide an orthogonal slot arrangement to maintain the beam in a Y-axis slot.

In order that the target can be set up with the beam just overlapping onto both orthogonal assemblies, the bar defining the slot can have edge portions as shown in FIG. 8A, and one of the parts 512 and 514 can be mounted to be adjustable in the transverse direction so as to adjust the slot width.

In the system of FIG. 2 the use of two laser beams to detect skewing of cradle 22 was discussed. Another requirement that may arise is to install the laser transmitter unit at intervals for surveillance over relatively short periods. In this case the unit should be installed on a later occasion so as to have the, or each, monitoring laser beam defining precisely the same spatial datum as on the previous occasion. While the laser assembly of FIG. 2 might be used to that end FIG. 9 shows a laser assembly that is particularly designed with these requirements in mind.

Figure 9:
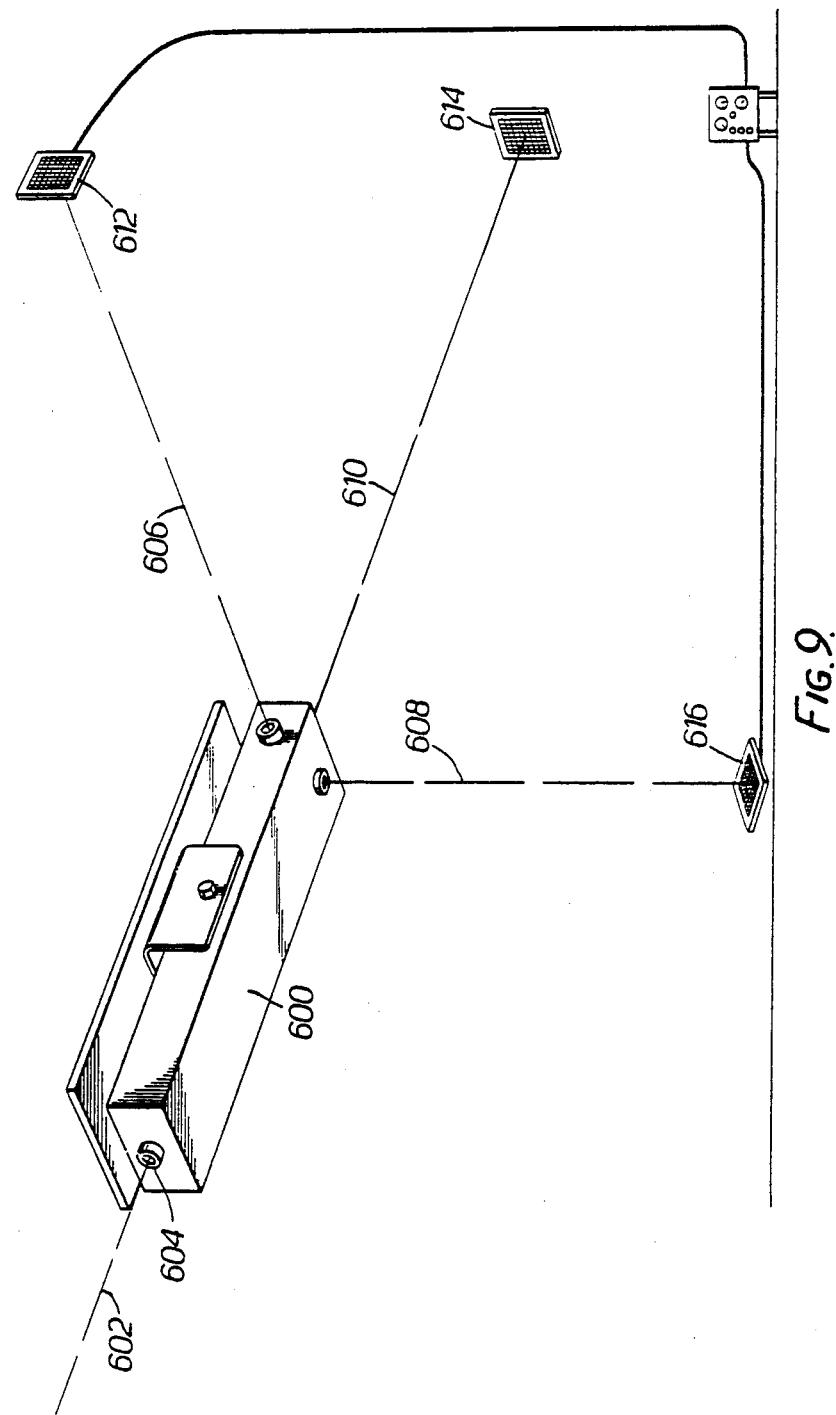
FIG. 9 shows a laser assembly providing plural reference beams and associated beam position measurement means for use in aligning the laser transmitter unit.

In FIG. 9 a laser housing 600 contains either a double-ended laser or two lasers mounted rigidly back-to-back. One laser beam 602 is emitted at port 604. The other is split by beam splitters (not shown) along mutually orthogonal axes (X-Y-Z) and emitted as respective orthogonal beams 606, 608 610 that impinge on respective detector matrices 612, 614 and 616 that are fixedly mounted. The primary laser beam 602 is used for surveillance or monitoring as described. The three secondary beams have their positions monitored by the three matrix detectors and recorded in an analyzer unit 620. The matrix detectors may use a fibre optic or photodiode matrix such as already described with reference to FIGS. 4A and 4B. After demounting the housing 600 after one period of surveillance, when it is installed for a further period the housing is postioned to give the same X, Y and Z positions of the secondary beams recorded from the previous installation. Thus, provided the internal laser assembly within housing 600 is constructed to accurately set the axis of primary beam 602 with respect to the secondary beams 606, 608 and 610, the housing can be remounted with the beams aligned as before demounting. The secondary beams could be generated by separate lasers instead of using beam splitting.

The apparatus described uses laser beams which are known for their low divergence and the beam can be focused by transmitter optics to converge on a desired target point or the receiver. In order to still further improve accuracy it is not proposed that a spatial filter can be employed in the receiver. Such an arrangement is shown in FIG. 10A for a focused converging beam and in FIG. 10B for an unfocused diverging beam.

In FIG. 10A the laser source 20 and its optics 28 focus the beam 40 on the detector 31 of the receiver 30. In front of the detector 31 is mounted an iris 33 (FIG. 10C) having an aperature 33A that effectively selects only the central axial portion of the beam for detection and thus acts as a spatial filter. FIG. 10B shows the even more pronounced spatial filtering performed on a diverging beam 40' where the effective detected beam is reduced to the axial portion 40A. This spatial filtering technique is of general utility.

Yet another monitoring system is illustrated in FIG. 11 and is particularly intended to provide a relatively inexpensive system in which a plurality of targets can be used in line, each providing a measure of the laser beam position relative to the target. Such arrangements may be of advantage in civil engineering such as for temporary or permanent monitoring of movement of embankments.

In FIG. 11, a laser 20 is mounted to its cradle supported on the ground of an embankment say. The laser beam 40 has a plurality of targets 700 fixed to mounting posts in the ground along the section to be monitored and preferably means 710 is provided to stop the beam, e.g. a non-reflective plate, at the end of the monitored section. Each target is as shown in FIG. 11A. The target comprises a rectangular (square) frame 720 which carries across the aperture 722 a mesh 724 of fine cross-wires of say 0.02 to 0.1 mm cross-section, the wires being spaced say at 5 mm intervals. The mesh 724 is an open mesh of orthogonally arranged wires forming an X-Y measurement grid within the frame. The wires are bonded at the intersections and all the cross-points as exemplified by points 726 are made reflective by applying a reflective coating if necessary. The frame is conveniently marked with X-Y scales 728, 729 in accord with the grid on the surface facing laser 22. The target 700 is mounted to a support member 730 which in turn is attached to a suitable ground post. Preferably as shown in the side view of FIG. 11B the target is mounted in a double-sided shroud housing 732 to protect it against the weather.

In operation the targets 700 are set up along the laser beam datum. The beam is in the visible spectrum to provide a visible indication of its position relative to each target by seeing the reflection at the cross-points as exemplified by the detail view of FIG. 11C of a mesh 724 with the beam 40 illuminating two cross-points 726. The mesh dimensions are chosen with regard to the fineness of measurement required and the need as seen from FIG. 11C to allow sufficient beam to pass through the mesh to illuminate at least one further target.

The system is relatively simply and inexpensive to install and the position monitoring is performed by simple manual inspection. In some instances it may be sufficient to note whether or not the beam remains on the mesh. For monitoring slippage of an embankment, say, beyond limits set by the overall size of the mesh, the frame 720 bounding the mesh on the side facing the laser could be provided with a photo-detector arrangement providing a warning output if the beam starts to impinge on the frame.

In some circumstances, the path surveilled by the various systems described may lie vertically or substantially so. In most such instances the laser source will be at the lower end of the path, for example supported at ground level. Particularly where systems are to be active over a prolonged period there is a risk of dirt or rain falling on the laser optics to reduce performance. The same problems arise with using a protective window.

Figure 12:
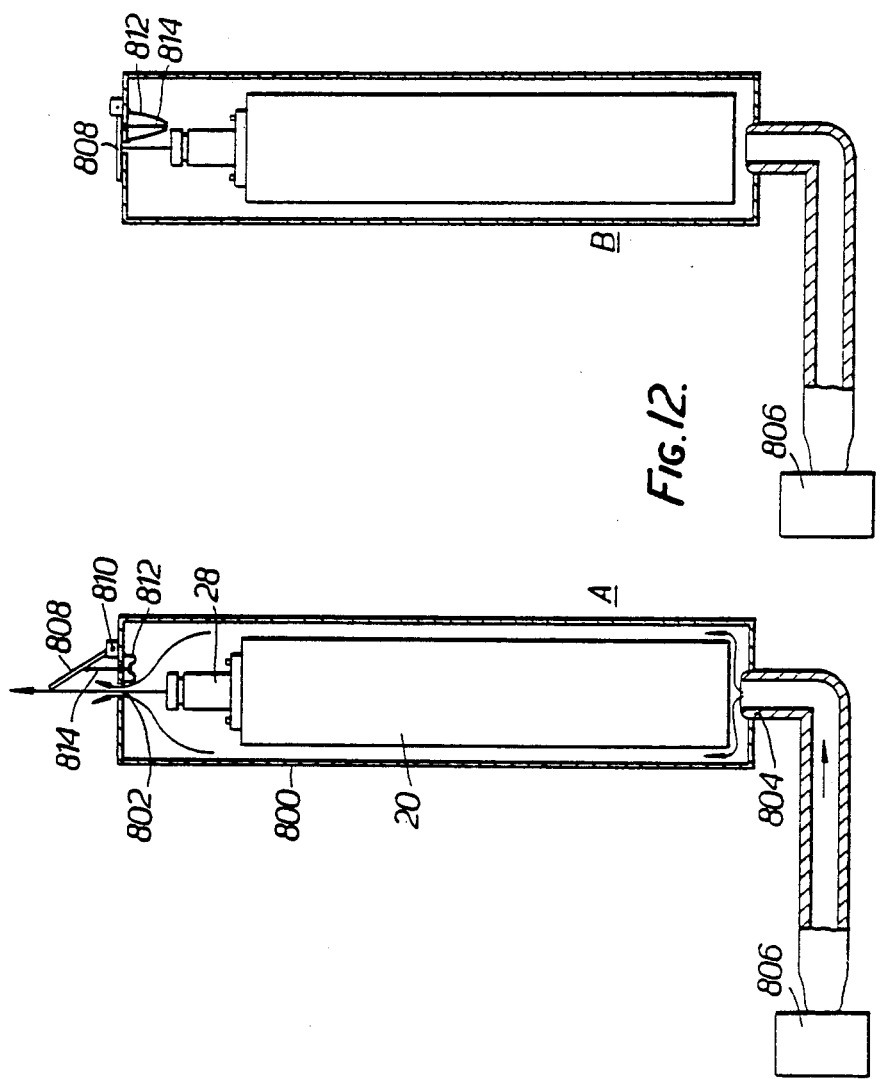
FIG. 12 shows a laser provided with an air purging device to prevent contamination of the optics in accord with this invention.

FIG. 12 shows a laser housing designed to resist ingress of dirt etc. The left of the figure marked A shows the housing open for the laser light. The right of the figure marked B shows the housing sealed. The laser 20 is mounted vertically in a closed weatherproof housing 800 the upper end of which is provided with a small aperture 802 through which the laser beam exits the housing 800. The aperture need only be small, just sufficient to pass the beam. The housing contains an air inlet 804, shown as being in the lower end of the housing, connected to a compressor or blower 806 which continuously blows a current of filtered air through the housing to leave at the aperture 802. Because the aperture is small a pressure well in excess of atmospheric is readily achieved in the housing such that the air jet forced through aperture 802 is sufficient to prevent water droplets, dust or the like from entering the housing.

As well as having a protective function for the laser optics 28, the air flow along the laser assembly can be used for temperature regulation, for example for cooling.

It is also desirable that the laser and its optics should remain protected if the air supply fails. To this end, the aperture 802 is provided with an exterior closure flap 808 pivotally mounted at 810. Within the housing a pressure responsive resilient diaghragm 812 is mounted and is coupled to the flap through a link 814. In the absense of sufficient pressure the resilient diaphragm closes the flap as seen at B. With the air supply operating as required the diaphragm causes the flap to open as seen at A.

Although the invention has been described mainly with reference to detecting movement of building structures, it can be applied to other structures such as plant and equipment susceptible to dynamic and/or other movement. Pressure vessels come to mind.

The preceding description has disclosed numerous ways of detecting relative movement between a target and a laser beam datum. It will be appreciated that the same techniques can be applied to bring parts of structures or components or machinery into a required alignment by aligning a target on one part with a reference beam established on another part.

Referring again to FIG. 6, the system there illustrated has a number of targets mounted along a structure. FIGS. 6A and B show details of a target construction having two orthogonally disposed movable members providing beam-intersecting straight edges. FIG. 6B shows an actuator for one such member and a measuring scale device provided between the member and a frame portion of the target.

In some circumstances where a relatively infrequent check of a structure is to be made, it is thought desirable to provide a system in which a small number, and preferably one, target is used to monitor a structure at a number of points. In such cases it may also be sufficient to have a target of the general kind disclosed above on which actuation of the or each movable member is done manually and reading can be taken manually. Such a facility may be particularly useful in monitoring civil engineering structures such as embankments, banks of reservoirs and dams. One such system has already been described with reference to FIGS. 11, 11A, 11B and 11C. Another such system having features more akin to FIGS. 6 to 6B is shown in FIGS. 13 to 13C.

In FIG. 13 an embankment or like work 350 has a plurality of target-mounting points 352 established along the portion of the embankment to be monitored. At fixed points 354 at either end of the path away from the portion that may be subject to movement, a laser transmitter 20 and receiver 30 are demountably set up, though with high repeatability of positioning at each re-mounting. Preferably the receiver is spatially filtered as described with reference to FIGS. 10A-C.

As seen better in FIG. 13A, each target-mounting point 352 comprises a substantial base 360, e.g. concrete, set in the ground to move therewith, and capped by a support plate 362 secured to the base and to which a tripod 364 is rigidly secured. The tripod in turn carries a target-support plate 366 to which a target 370 is detachably mounted. The support plate 366 anda target 370 are constructed to have a precisely repeatable mounting, i.e. provided with means accurately locating one with respect to the other.

Looking at use of the system in general, the tripods will be permanently available at the points 352. Whenever a periodic check is called for the laser and receiver are re-established at 354 to establish the laser beam 40 as a datum the same as on the previous measurement. The target is then set up on the tripods in succession and a measure of the relative position of the beam to the target is made at each point 352. The values obtained can then be compared with those obtained on a previous occasion. Thus no more than one target need be used, though more could be used if desired.

Referring to FIGS. 13B and C the target 370 has a frame 372 in which are supported two members 374 and 376 providing straight edges 375 and 377 respectively movable in orthogonal directions (X-Y). As better seen in FIG. 13C the movable member 374 is moved by coupling to the spindle 378 of a micrometer 380 whose body 382 is fixed to the target frame. The other member is likewise actuated. As already discussed in relation to FIG. 6, the relative beam position is measured at the point of intersection of the beam by the straight edge. This can be signalled by means not shown from the beam interruption detected at the receiver 30 or by providing a light guide at the straight edge cooperating with a suitable detector. As already described only one movable member is necessary if its straight edge is provided with means—a linear array of optical fibre ends or of photo-diodes—to make a measurement in the transverse direction. However the use of two manually adjustable straight-edge members is simple requiring the minimum of additional extra circuitry.

The signalling from the receiver can be done by means of a tone interrupted when the beam is interrupted. To overcome possible jitter at the point of intersection, an edge-triggered device could be used, triggered to interrupt the tone at a point of predetermined signal reduction. Alternatively, the tone could be in one state, say one, when the beam was not interrupted or fully blocked but off in the intermediate intersection zone, at which time the measurement would be taken.

It will be appreciated that the intersection point can be read off the micrometer scale as in FIG. 13C or a separate caliper-like scale could be provided on the frame 372 which is read against an index on the movable member. In this case the manual drive could be a simple lead screw or other equivalent.

While the system described has tripod supports, these could be replaced by posts or any other suitable support. The supports themselves may be made detachable from the base. Again there should be an accurate repeatability of positioning when re-mounting the support to the base.

It will also be appreciated that the system could also be employed in re-aligning a structure subject to differential movement, where parts of the structure along the monitored path were capable of being adjusted in position.

In the foregoing description the laser light used may be in the visible spectrum or outside the visible spectrum except in those embodiments which specifically require viewing of the beam when obviously light within the visible spectrum is used. The use of light within the visible spectrum is generally of value in setting up equipment so that the beam can be seen.

We claim:
1. Apparatus for montoring deflections of a structure relative to a laser beam, comprising:
   (a) a structure to be monitored;
   (b) a laser mounted at a first location to direct a laser beam along a path extending adjacent a portion of the structure;
   (c) at least one target mounted to said structure at a location adjacent the path of the laser beam, wherein said target comprises:

(d) a support portion fixed to the structure at the target location,
(e) at least one member having a beam intercepting edge movable with respect to said support portion between positions displaced from and intercepting the beam, respectively,
(f) actuator means acting between said support portion and said member to move said member between said positions,
(g) means for detecting the interception of the beam by said member, and
(h) means for measuring the position of the member relative to the support portion at beam interception.

2. Apparatus as claimed in claim 1, wherein said target comprises:
(a) a further member having a beam intercepting edge movable with respect to said support portion between positions displaced from and intercepting the beam, respectively, said one member and said further member being movable in different directions;
(b) further actuator means acting between said support portion and said further member to move said further member between said positions, and
(c) further means for measuring the positions of said further member relative to the support portion at beam interception.

3. Apparatus as claimed in claim 1, wherein said beam intercepting edge and is movable along an axis normal to said edge is a straight edge and to the laser beam.

4. Apparatus as claimed in claim 3, wherein said edge comprises a plurality of means spaced therealong to detect the interception of the laser beam thereby, anad provide a measure of the beam position relative to the target in the direction of said edge.

5. Apparatus as claimed in claim 1, wherein said interception detection means comprises a laser receiver at a location remote from said laser and beyond said target.

6. Apparatus as claimed in claim 2, wherein the beam intercepting edges of said one member and said further member are both straight edges, and said straight edges lie at right angles to one another, each of said one member and said further member being individually movable in a direction normal to its beam intercepting edge and to the laser beam.

7. Apparatus as claimed in claim 6, wherein said interception detection means comprises a laser receiver at a location remote from said laser and beyond said target.

8. Apparatus as claimed in claim 32, wherein each of said straight edges is provided with respective means for detecting the interception of a laser beam thereby.

9. Apparatus as claimed in claim 1, wherein the actuator means is manually driven.

10. Apparatus as claimed in claim 1, wherein the actuator means comprises a motor drive.

11. Apparatus as claimed in claim 10, comprising a plurality of targets secured to said structure at spaced locations adjacent the beam path, and control means for successively actuating the actuating means for each target such that successive targets provide measurements and are maintained in a non-beam intercepting position when not being actuated for measurement.

12. Apparatus as claimed in claim 1, wherein said member comprises two parallel, spaced apart beam intercepting edges movable together such that the beam passes between the edges, and beam interception detecting means on each edge for detecting relative deflectios of the beam toward one or another edge.

13. Apparatus as claimed in claim 12, wherein the beam interception detecting means on one edge comprises means for detecting the position of the beam along said one edge.

* * * * *